May 27, 1958 Y. PEARSON 2,836,027
GRASS HEADER
Filed April 16, 1956 2 Sheets-Sheet 2
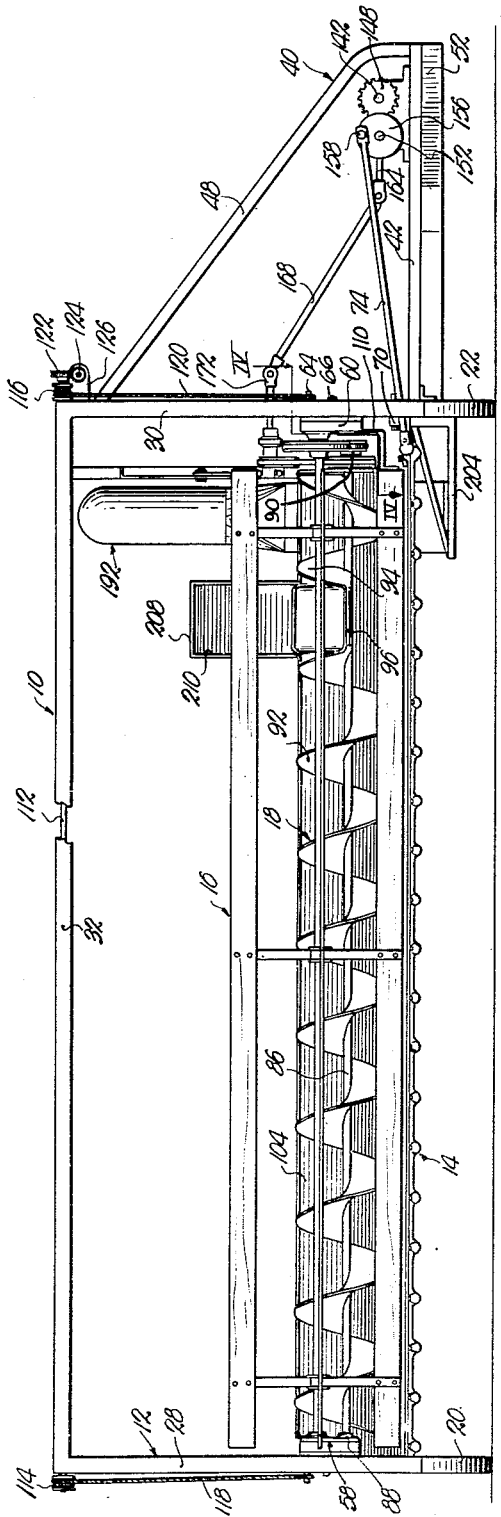
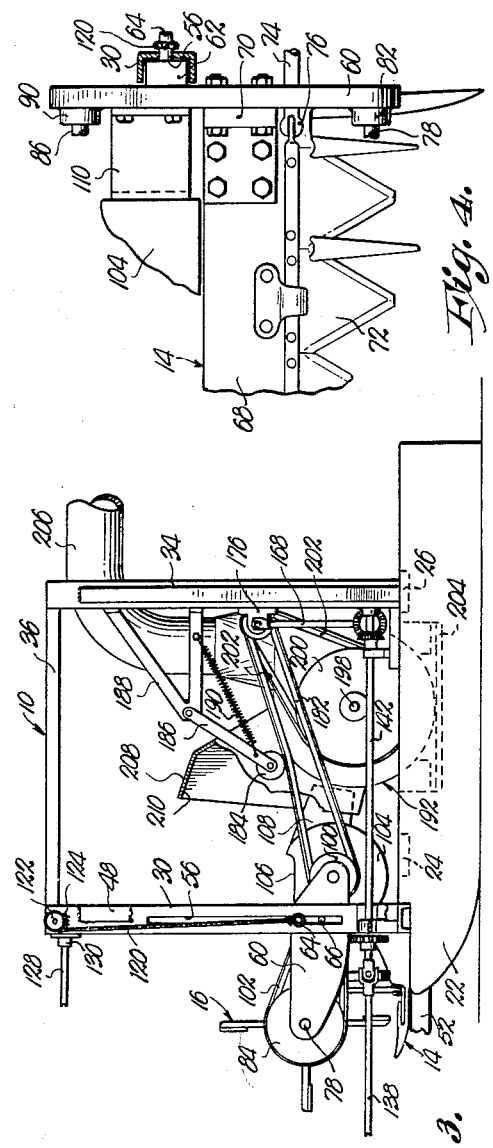
INVENTOR.
Yates Pearson
BY
ATTORNEY.

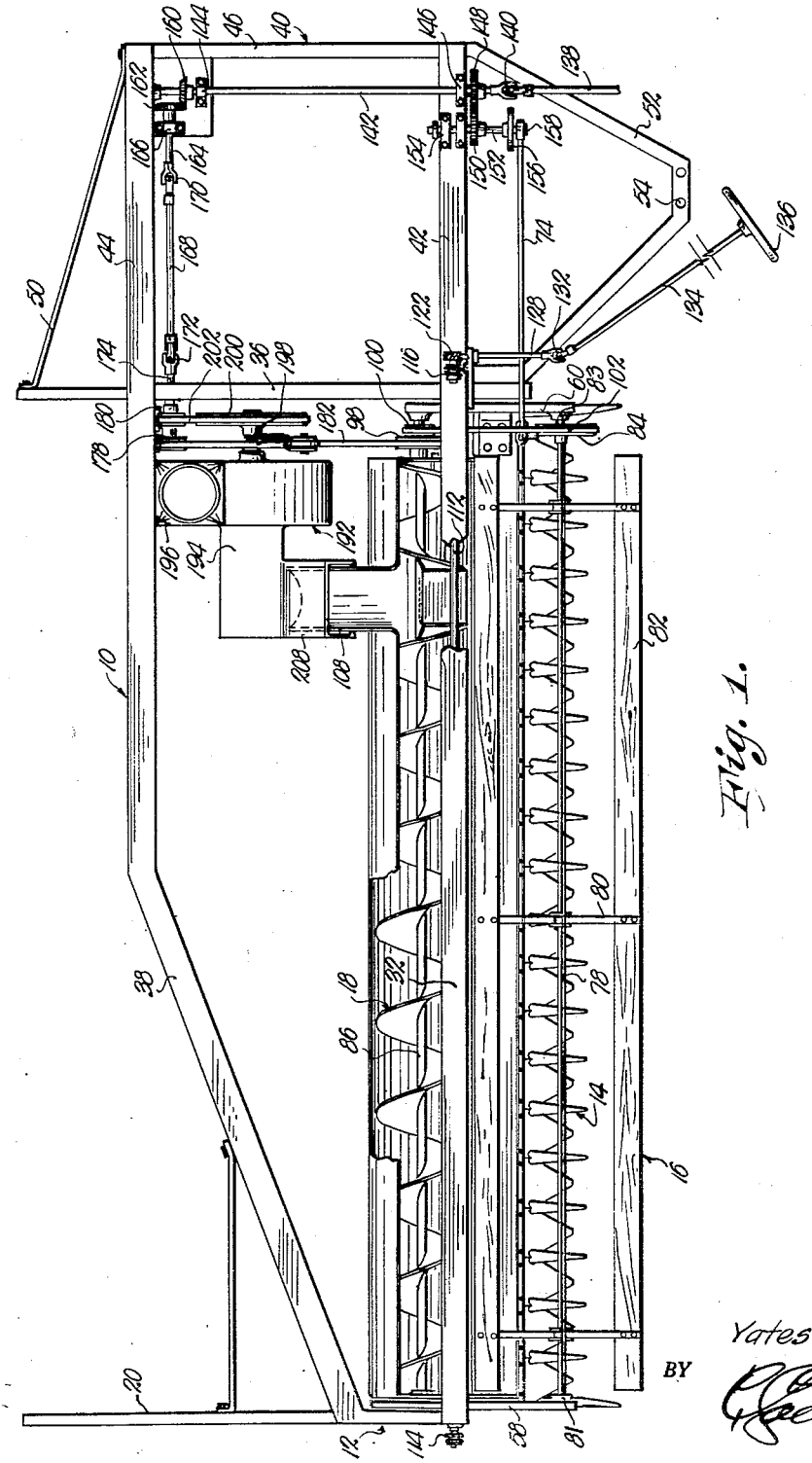
Fig. 1.
INVENTOR.
Yates Pearson
BY
ATTORNEY.

United States Patent Office 2,836,027
Patented May 27, 1958

2,836,027

GRASS HEADER

Yates Pearson, Liberty, Mo.

Application April 16, 1956, Serial No. 578,303

1 Claim. (Cl. 56—158)

This invention relates to improved apparatus for the heading of certain seed crops, particularly grasses such as bluegrass.

Much difficulty has heretofore been encountered when using previously available harvesting implements in connection with the heading of bluegrass or the like, in that, an unsatisfactory portion of the full yield has been successfully gleaned. Conventional equipment intended for such purpose has customarily employed spiked drum means for initial securement of the grass heads into the apparatus, such means being thought essential because of the varying heights at which the grass heads occur in different portions of a field to be harvested. The use of spiked drum type apparatus has, however, been attended by the relatively low efficiency of yield harvesting characteristic of such structure.

It is the primary object of this invention to provide a harvesting implement for overcoming the problems of grass seed heading and gathering and to effect such operation in manner greatly increasing the proportion of the yield which is gleaned.

It is another important object of the invention to provide such improved grass heading apparatus in which a conventional sickle bar may be used as the heading mechanism, the efficiency of such sickle bar means for such purpose being significantly better than can be obtained with spiked drums such as are now commonly used.

It is another important object of the invention to provide such an implement wherein the sickle bar is shiftably mounted for adjustable positioning to the height required for maximum efficiency in reaping the grass heads in any particular portion of a field being harvested.

It is another important object of the invention to provide in combination with the sickle bar a rotating, gathering reel and a conveyor assembly, all of which maintain fixed positional relationships to each other but which are shiftable upwardly or downwardly together to accommodate the height of grass heads in a particular portion of the field being harvested.

It is another important object of the invention to provide such an implement which is relatively simple in character and, therefore, inexpensive to manufacture and convenient and foolproof in use.

Still other important objects of the invention, including certain important details of construction, will be made clear or become apparent as the following description of the invention progresses.

In the accompanying drawings:

Figure 1 is a top plan view of a grass header implement made in accordance with the teachings of the invention, parts being broken away for illustrative purposes;

Fig. 2 is a front elevational view of the implement of Fig. 1, parts being broken away for illustrative purposes;

Fig. 3 is a side elevational view of the implement of Figs. 1 and 2, parts being broken away and shown in section for clarity of illustration; and Fig. 4 is an enlarged, fragmentary, sectional view taken on line IV—IV of Fig. 2.

The grass header implement of the invention is generally designated in the drawings by the numeral 10. Implement 10 broadly includes a frame assembly 12, a sickle bar assembly 14, a rotatable gathering reel assembly 16, a conveyor assembly 18, and the various post assemblies and mechanical linkages hereinafter described.

Frame 12 includes a pair of parallel, sled-like runners 20 and 22 interconnected by suitable cross members such as at 24 and 26, a pair of upstanding, elongated posts 28 and 30 of generally U-shaped or channel-like cross section rising from the runners 20 and 22 respectively, adjacent the forward extremities thereof, an upper cross piece 32 interconnecting the posts 28 and 30 at their upper extremities, an upstanding rear post 34 on the runner 22, a bracing member 36 interconnecting the posts 30 and 34 adjacent their upper extremities, rear bracing structure 38 interconnecting the post 34 with the post 28 upon runner 20, and a laterally extending sub-frame assembly generally designated 40. Sub-frame assembly 40 will preferably include forward and rearward laterally extending members 42 and 44, respectively, joined at their outermost extremities by a bracing member 46, and other bracing structure of any suitable nature such as the upright, diagonal brace 48 and the rear bracing structure 50. A draw bar 52 provided with holes as at 54 for coupling with a tractor or other prime mover (not shown) is secured in any suitable fashion to the frame assembly and extends forwardly thereof.

Each of the forward posts 28 and 30 is provided with an elongated, upright slot 56, the concave sides of the channeled posts 28 and 30 facing inwardly toward each other as indicated in Fig. 4 to present a pair of opposed guide tracks. Adjacent the posts 28 and 30 are vertically shiftable support structure including provided mounting plates 58 and 60, respectively. As best illustrated in Fig. 4, each of plates 58 and 60 includes a laterally extending runner portion 62 adapted to slide within the guide track channel of the corresponding post 28 or 30. On each runner portion is provided a pair of laterally extending pins 64 and 66, both of same extending through the slot 56 of the corresponding post 28 or 30. The pins 64 and 66 on each of the mounting plates 58 and 60 are vertically offset and serve as guides for limiting the plates 58 and 60 to parallel, vertical paths of travel.

The sickle bar assembly may be of conventional character and, as indicated in Fig. 4, has its stationary cutter bar part 68 rigidly attached at its opposite extremities to the mounting plates 58 and 60 by bracket means 70, the shiftable cutter blade part 72 of the assembly 14 being coupled with a pitman rod 74 extending outwardly over the sub-frame 40 by means of a pivot coupling 76. It will thus be clear that the sickle bar assembly 14 is carried by the plates 58 and 60 and vertically shiftable with the latter.

The reel assembly 16 may be conventional in character including a main shaft 78 from which extend a number of radial supports 80 carrying the elongated reel bars 82 in radially spaced, circumferential relationship to the shaft 78. The shaft 78 is rotatably mounted at its opposite ends on plates 58 and 60 by bearing means 81 and 83, respectively. A drive pulley wheel 84 is rigidly fixed on the shaft 78. It will thus be clear that since both the sickle assembly 14 and the reel assembly 16 are mounted upon plates 58 and 60, same will maintain a relatively fixed positional relationship therebetween, while both being vertically shiftable with the shiftably mounted plates 58 and 60.

The conveyor assembly 18 includes a shaft 86 rotatably mounted at its opposite ends on plates 58 and 60 by bearing means 88 and 90, respectively. Shaft 86 carries an auger-type conveyor having opposed flights 92 and 94 with a delivery paddle blade 96 disposed between the opposed flights 92 and 94. It is noted that the delivery paddle 96 is preferably located somewhat nearer the post 30 than the post 28, so that the flights 92 occupy a greater stretch of the shaft 86 than do the flights 94. The shaft 86 carries a pair of pulley wheels 98 and 100, the pulley wheel 100 being coupled with the pulley wheel 84 on reel shaft 78 by a belt 102.

An elongated shield or housing 104 having an open front and top as at 106 extends around the rear and bottom of the auger assembly 92—94—96, and is provided with a rearwardly extending discharge spout 108 disposed opposite the delivery paddle 96. The shield or housing 104 extends between and is mounted upon the opposed plates 58 and 60 by bracket means 110, as best shown in Fig. 4. It will thus be clear that the sickle assembly 14, reel assembly 16 and conveyor assembly 18, including both the auger 92—94—96 and the auger housing 104 are all mounted in relatively fixed position upon the shiftable plates 58 and 60 for raising or lowering with the latter.

A shaft 112 extends between and is rotatably mounted on the posts 28 and 30 adjacent their upper extremities and is provided upon its opposite ends with the windlass drums 114 and 116. Drums 114 and 116 have respectively secured thereto and wound thereabout flexible cables 118 and 120 whose lower ends are secured to the upper pin 64 on rail portion 62 of the plates 58 and 60 respectively. Shaft 112 is provided with a pinion 122 on the end thereof adjacent post 30, such pinion being meshed with a worm gear 124 rotatably mounted on the post 30 by means of a bracket 126. Worm 124 is axially connected with a worm drive shaft 128 rotatably mounted by bearing means 130 on the bracket structure 126. Connected with the forwardmost end of forwardly extending worm drive shaft 128 by means of a preferably flexible coupling 132 is a control shaft 134 provided with a hand wheel 136 adapted for extending to a position within the reach of an operator seated upon the tractor or other prime mover (not shown), suitable support means for the shaft 134, of course, being preferably provided on the tractor itself. Thus, the control mechanism just described for controlling the reciprocated position of the support structure plates 58 and 60 operates as follows. As the operator turns hand wheel 136 to rotate shafts 134 and 128, the worm 124 will be operated to rotate pinion 122 and shaft 112. As shaft 112 rotates, it will either let out or take up the cables 118 and 120, as desired, thereby simultaneously raising or lowering the plates 58 and 60 and sickle assembly 14, reel assembly 16 and conveyor asembly 18 therewith. It may be observed that the plates 58 and 60 are rigidly connected by the bar part 68 of sickle assembly 14 and the shield housing 104 of the conveyor assembly 18, so that the plates 58 and 60 form a part of a rigid, shiftable sub-frame-like assembly.

Power for the implement 10 is obtained through a power take-off shaft 138 adapted for coupling with the conventional power take-off (not shown) portion of the prime mover or tractor with which the implement 10 is used. Power take-off shaft 138 is connected through a flexible coupling 140 with a shaft 142 rotatably mounted on the sub-frame 40 by bearing means 144 and 146. Pinion 148 on shaft 142 meshes with a gear 150 on a stub shaft 152 rotatably mounted upon the sub-frame member 42 by bearing means 154. Stub shaft 152 carries a wheel 156 having an eccentric pin 158 to which the pitman 74 is pivotally connected. Thus, as power take-off shaft 138 rotates shaft 142 and pinion 148, gear 150 will rotate stub shaft 152 and wheel 156, and the eccentric pin 158 will reciprocate the pitman 74 to operate the movable blade parts 72 of the sickle assembly 14.

Shaft 142 is also provided adjacent its rear extremity with a bevel pinion 160 meshing with a bevel gear 162 on a stub shaft 164 rotatably mounted at right angles to shaft 142 on sub-frame 40 by bearing means 166. A coupling shaft 168 is connected by a flexible coupler 170 with stub shaft 164 and extends therefrom upwardly to a flexible coupler 172 connecting the same with a stub shaft 174 rotatably mounted on the rear post 34 by bearing means 176. Stub shaft 174 carries a pair of drive pulleys 178 and 180. Pulley wheel 178 is coupled with the pulley wheel 98 on conveyor shaft 86 by means of a belt 182. An idler wheel 184 rides upon the belt 182 and is rotatably mounted on an arm 186 swingably secured to post 34 by bracket means 188, a spring 190 interconnecting the arm 186 and bracket 188 to yieldably bias the idler pulley wheel 184 toward belt 182 for maintaining the latter tight regardless of the vertical position to which the plates 58 and 60, and therefore the pulley wheel 98, may be shifted.

Although various types of elevating conveyors could conceivably be used to transport seeds delivered from the discharge spout 108 to an elevated position for delivery into sacks, a trailer or the like, the preferred embodiment of the invention illustrated utilizes a blower assembly generally designated 192 having an inlet 194, an outlet 196 and an operating shaft 198. Shaft 198 is provided with a pulley wheel 200 which is coupled with the pulley wheel 180 on stub shaft 174 by means of a belt 202. It will be noted that the blower assembly 192 is stationarily mounted upon the frame portion of implement 10 by any suitable means as indicated at 204, so that there is no relative shifting between the blower shaft 198 and stub shaft 174. The outlet 196 of blower assembly 192 is provided with an upwardly and rearwardly extending conduit 206 from which discharge of harvested seed may be made into any suitable container. In order to allow for vertical shifting of the discharge spout 108 of conveyor assembly 18 as the plates 58 and 60 are vertically shifted to dispose the sickle assembly 14 at the most advantageous height for harvesting, the inlet 194 of blower 192 is provided with a hopper 208 having an open front as at 210 into which the discharge spout 108 of conveyor assembly 18 extends inwardly and downwardly, as most clearly illustrated in Fig. 3. It will thus be clear that, as the plates 58 and 60 are vertically shifted, the discharge spout 108 of conveyor 18 shifts within the open front 210 of hopper 208 to effect delivery of said material discharged from the conveyor 18 to the elevating blower assembly 192.

It will now be clear that the significant improvement effected by this invention over the prior art involves the employment, in combination, of a sickle assembly 14, a reel assembly 16 and a conveyor assembly 18 for the harvesting of bluegrass heads and similar seed materials, wherein such operative parts are adapted for simultaneous vertical shifting relative to a frame by which they are indirectly carried, together with the provision of suitable complemental structures and structural relationships therebetween for presenting an efficiently operable implement. It will thus be clear that a number of minor modifications or changes could be made from the exact structure chosen for illustration without departing from the true spirit and intention of the invention. Accordingly, it is to be understood that the invention shall be deemed limited only by the fair scope of the claims that follow, when same are construed in the light of the contribution to the art made by the invention.

Having thus described the invention, what is claimed as new and desired to be secured by Letters Patent is:

In a grass header implement provided with a mobile frame assembly having ground engaging supporting structure and adapted to be coupled with independent means for pulling the same, the combination with said mobile frame of a pair of upright, horizontally spaced channel posts secured to the same and disposed with the concave sides thereof in facing relationship, each of said posts having an elongated, relatively narrow slot therein; an elongated, longitudinally horizontal mounting plate disposed adjacent the concave side of each of the posts at the lower end thereof, said plates being positioned in longitudinal parallel relationship and each having a runner portion reciprocably disposed in the channel of a corresponding post, there being a pair of vertically spaced, laterally extending pins on each of the runner portions and projecting through the slot in a respective post; an elongated, horizontal windlass shaft rotatably carried by the posts at the upper end thereof and having a windlass drum on each end of the same; an elongated flexible cable wound around each of the windlass drums and having one end thereof secured to a corresponding pin on respective runner portions of the plates; rotatable, manually operable means carried by the frame and coupled with said windlass shaft and operable from a remote position on said independent means for shifting the plates in a vertical plane as said manually operable means is rotated; an elongated sickle bar assembly mounted on and spanning the distance between said plates and provided with a longitudinally reciprocable blade; a reel assembly spanning the distrance between and mounted on the plates and having a reel positioned above the sickle assembly and rotatable with respect to the plates; an elongated transfer assembly mounted on the plates rearwardly of the sickle bar assembly with respect to the reel and provided with a rotatable conveyor spanning the distance between the plates, there being first and second pulleys attached to the conveyor and said reel respectively; a power shaft rotatably carried by the frame and adapted to be operably coupled with power take-off means on said independent means; pulley means operably coupled with said power shaft and rotatably mounted on the frame in fixed positions with the axes of rotation thereof in parallel, horizontally spaced relationship to the axes of rotation of said first and second pulleys; flexible belt means interconnecting said pulley means and the first and second pulleys; and mechanism operably coupling the blade with said shaft for reciprocating the blade including eccentric structure rotatable on an axis parallel with said power shaft and a pitman rod coupled with the eccentric structure and said blade in longitudinal parallelism with the latter whereby the reel and conveyor may be rotated irrespective of the vertical position of said plates.

References Cited in the file of this patent

UNITED STATES PATENTS

| | | |
|---|---|---|
| 576,588 | Kullberg | Feb. 9, 1897 |
| 959,819 | Towner | May 31, 1910 |
| 1,154,493 | Drygas | Sept. 21, 1915 |
| 1,529,003 | Alling | Mar. 10, 1925 |
| 2,484,981 | Coultas | Oct. 18, 1949 |
| 2,492,223 | Jenson | Dec. 27, 1949 |
| 2,637,965 | Simpson et al. | May 12, 1953 |
| 2,694,891 | Brown | Nov. 23, 1954 |